United States Patent [19]

Wittrisch et al.

[11] Patent Number: 5,111,880

[45] Date of Patent: May 12, 1992

[54] SYSTEM FOR DRIVING A NON RIGID EXPLORATION DEVICE INTO A WELL WHERE ITS PROGRESSION BY GRAVITY IS DIFFICULT

[75] Inventors: Christian Wittrisch, Rueil-Malmaison; Jean-Claude DuBois, Courdimanche, both of France

[73] Assignee: Institut Francais du Petrole, Rueil Malmaison, France

[21] Appl. No.: 622,835

[22] Filed: Dec. 5, 1990

[30] Foreign Application Priority Data

Dec. 5, 1989 [FR] France ............................... 89 16170

[51] Int. Cl.⁵ ............................................... E21B 47/12
[52] U.S. Cl. ........................................ 166/250; 166/66; 166/385
[58] Field of Search ............... 166/250, 254, 381, 382, 166/385, 65.1, 66, 153, 156; 367/25, 86, 911; 73/151; 324/323, 333, 346, 355

[56] References Cited

U.S. PATENT DOCUMENTS

| | | | |
|---|---|---|---|
| 2,139,460 | 12/1938 | Potapenko | 166/254 |
| 2,938,592 | 5/1960 | Charske et al. | 166/254 |
| 4,349,072 | 9/1982 | Escaron et al. | 166/250 |
| 4,457,370 | 7/1984 | Wittrisch | 166/250 |
| 4,485,870 | 12/1984 | Walulik | 166/250 |
| 4,488,597 | 12/1984 | Hoppe et al. | 166/250 |
| 4,560,934 | 12/1985 | Dickinson | 166/250 |
| 4,664,189 | 5/1987 | Wittrisch | 166/250 |
| 4,690,214 | 9/1987 | Wittrisch | 166/250 |
| 4,789,968 | 12/1988 | Rice | 367/25 |
| 4,945,987 | 8/1990 | Wittrisch | 166/250 |

Primary Examiner—Terry Lee Melius
Attorney, Agent, or Firm—Antonelli, Terry Stout & Kraus

[57] ABSTRACT

A guiding system for driving a non rigid exploration device in wells where progression by gravity is difficult includes a tubular column for guiding the displacement of the device which includes a plurality or set of sondes joined together by non-rigid connecting means into a deflected well zone. A first sonde of the set is at least fitted with anchoring arms and its cross-section and possibly that of all the remaining sondes of the set can be larger than the cross-section of the tubular column. In this case, a more or less long protective housing is provided at the end of the column. A delayed electric connection device for the set of sondes linked to a surface laboratory is utilized. The first sonde is pushed out of the column by a fluid pressure and anchoring arms of the first sonde are opened. The tubular column is pulled backward and upward in order to make the plurality of sondes to come out of the column and to be positioned in the well and, thereafter, measuring cycles are carried out.

15 Claims, 8 Drawing Sheets

SYSTEM FOR DRIVING A NON RIGID EXPLORATION DEVICE INTO A WELL WHERE ITS PROGRESSION BY GRAVITY IS DIFFICULT

BACKGROUND OF THE INVENTION

The present invention relates to a system for driving a non rigid exploration device into wellbores where its progression by gravity is difficult.

In a general way, the system according to the invention is suitable each time the friction forces are sufficient to prevent the progression of an exploration device along a borehole. This may happen because of a restriction of the section of a well and/or because of its substantial inclination in relation to the vertical.

The system according to the invention can for example be used for driving up to horizontal areas of a well an emission-reception device for acoustic, electric, electromagnetic signals, etc, of any type.

In the field of acoustic waves for example, the design of an emission-reception system is different depending on whether a more or less long-range exploration of the land areas crossed by a well by means of low frequency acoustic waves is favoured, in order to study the limits of a possible reservoir, or a more localized study of the formations around such a well.

It is well-known that the most interesting results, when low frequency acoustic waves are used, are obtained by substantially moving away the emitters and the receivers. This can be achieved by arranging a seismic source at the surface and by displacing a reception set in a deflected well zone at a given depth under the surface.

French Patent 2,609,105 corresponding to U.S. Pat. No. 4,945,987, describes a method for carrying out measurings in a well zone that is strongly inclined in relation to the vertical by means of a sonde for wells containing appropriate sensors and fitted with one or several retractable arms whose opening allows to press it against the walls. The sonde is fastened to the end of a tubing and linked to the latter by retractable locking means. It is taken down and pushed up to the area of action by a tubular column progressively formed by the successive interconnecting to the first one of a series of additional tubing sections. The sonde is linked with a surface installation by a multifunction cable. Interconnecting the cable with the sonde is preferably achieved when the latter has reached a certain depth. The cable, fitted with a socket connector that can be plugged in in a liquid medium, is introduced into the column through a lateral window in a special connection sub (side-entry sub). The connector is pushed until it plugs into a contact plug fastened to the locking means and linked to the sonde by a linking cable. When the sonde has been pushed up to the intervention area, the opening of the locking means which fasten it to the bottom of the column and the opening of its fastening arms are remote controlled through the cable. The sonde can then be detached from the column by moving the latter back and the waves emitted at the surface can then be received.

Emission-reception systems where the emission means are also taken down into a wellbore are well-known. The emission means and the reception means can be contained in the same well tool or in different tools hanging one under another.

A sizeable space between the emitters and the receivers can be obtained quite easily in the wells or in portions of vertical wells by lengthening the cables linking the sonde or the main tool with the satellites hanging below. A system suitable for substantially vertical wells is for example described in French Patent 2,616,230.

Nevertheless, such a device emitting and receiving acoustic waves with multiple, very spaced out sondes, becomes totally ineffective in cases where the progression by gravity cannot be achieved normally because of excessive friction forces, as it happens in well zones with a limited section or too much inclined in relation to the vertical.

French Patent EN. 89/04,554 corresponding to U.S. patent application Ser. No. 505,902, filed Apr. 6, 1990 describes a seismic prospecting method in deflected wells by means of an emission-reception set of acoustic waves displaceable in relation to the lower back end of a tubular column taken down in a well. The emission-reception set comprises a receiving sonde with retractable fastening arms arranged at the bottom of the column and linked to a moving element displaceable within the latter. It also comprises an acoustic source inserted on the column. The source can be fixed in relation to the column or displaceable in relation to the latter by means of the moving element. The wall of the column is fitted with lateral openings allowing the emission of acoustic waves towards the formations around the well. A multifunction cable fitted with a socket plug that can be plugged in in a liquid medium allows a delayed connection of the emission-reception set with a surface control and recording installation. The system is operating by fastening the sonde and by drawing it apart from the lower end of the column.

This prior system is suitable for prospecting operations utilizing sources that can be seated within the relatively narrow tubular columns which are generally used in wellbores. Sparkers can for example be utilized as sources.

Besides, the source being inserted on the tubular column, it emits its energy through slits in the wall. Part of the emitted energy tends to be transmitted along the column. Absorbing means must therefore be interposed in the portion of the tube between the source and the receiving sonde, in order to avoid direct transmissions towards the pickups.

It is also well-known that, in the field of acoustic or seismic wave prospecting, there are numerous treatment methods allowing to make the subsoil cross-sections obtained from the picked up and recorded signals more legible, by combining recordings of signals picked up in several different reception locations spaced out from one another along the well. This is not possible with the systems utilizing only one receiving sonde that are currently used, because of operating difficulties in the deflected wells.

SUMMARY OF THE INVENTION

The guiding system according to the invention avoids the drawbacks mentioned above. It allows to easily drive and operate, in wells where its progression by gravity is hampered, and notably in deflected wells, a non rigid exploration device of sizeable length including means for emitting signals in the formations around the well and means for receiving signals. The guiding system comprises a tubular column, a moving set displaceable in relation to the tubular column, a fastening part element for immobilizing the moving set in the well, and linking means for connecting the moving set with a control and recording laboratory. It is characterized in that the moving set comprises at least one supple part linked to the anchoring means, the moving set being displaceable between a recess (or backward) position where at least said supple part is totally contained in the back end of the tubular column and a withdrawal position where the moving element is totally outside the tubular column.

According to a first embodiment procedure, the moving set comprises a first sonde provided with anchoring means for coupling the sonde against the wall of a well and at least one second sonde linked to the first sonde by a portion of a multifunction cable.

According to a second embodiment procedure, the moving set comprises an extended supple element (supple sheath for example) linked to the linking means at a first end and to the fastening element at the opposite end thereof.

According to a first variant of the first embodiment procedure, the section of the first sonde is wider than that of the tubular column which is adapted for serving as a support for the first sonde, in said recess position of the set of sondes.

According to a second variant, the section of the first sonde and of at least one second sonde is wider than that of the tubular column.

The system according to the invention can comprise a moving set adapted for totally entering the tubular column in the recess position thereof.

According to an embodiment example, the signal emitting means is arranged in the sonde with a wider section.

The system can comprise for example a protective housing mounted on the lower end of the tubular column which can contain said sonde with a wider section.

According to another embodiment example, the tubular column comprises for example a string of hollow tubing sections and a tubular element fastened on the end of the string of pipes.

A tubular element and a housing which are long enough to contain the total moving element in its recess position are for example selected.

In an embodiment procedure of the system, the set of sondes can be directly linked to the surface control and recording laboratory by a multifunction cable and fitted with a support, the tubular column being fitted with a side-entry sub for the passage of said cable and with a section narrowing serving as a thrust for said support, in order to hold the moving element in a withdrawal position.

According to another embodiment procedure, the system comprises a guiding set displaceable within the tubular column and linked by the multifunction cable to the moving set, as well as means for locking the guiding element in order to immobilize the guiding element in relation to the tubular column in a recess position of the moving set.

The system can be fitted with means for the delayed connection of the moving set to the multifunction cable.

According to another embodiment procedure, the system comprises several sondes spaced out along the multifunction cable and containing the signal reception means.

The emitting means, in the first embodiment procedure, are for example arranged at the top of the moving set.

According to another embodiment procedure, the multifunction cable ends in a socket connector that can be plugged in a liquid medium in a contact connector borne by the guiding element, and electrically linked to the moving element.

According to another embodiment procedure, the exploration device guided by the system according to the invention comprises a multiplicity of well sondes containing the signal reception means and the signal emitting means is arranged at the surface.

The exploration device guided by the system according to the invention can also comprise emitting means arranged at the same time at the surface and in the moving set.

The emission and/or reception means of the exploration device guided by the system according to the invention can be acoustic, electric, electromagnetic, etc.

BRIEF DESCRIPTION OF THE DRAWINGS

Other features and advantages of the system according to the invention will be clear from reading the description hereafter of the embodiment procedures described by way of non limitative examples, with reference to the accompanying drawings in which.

DESCRIPTION OF THE PREFERRED EMBODIMENTS

Figure 1:
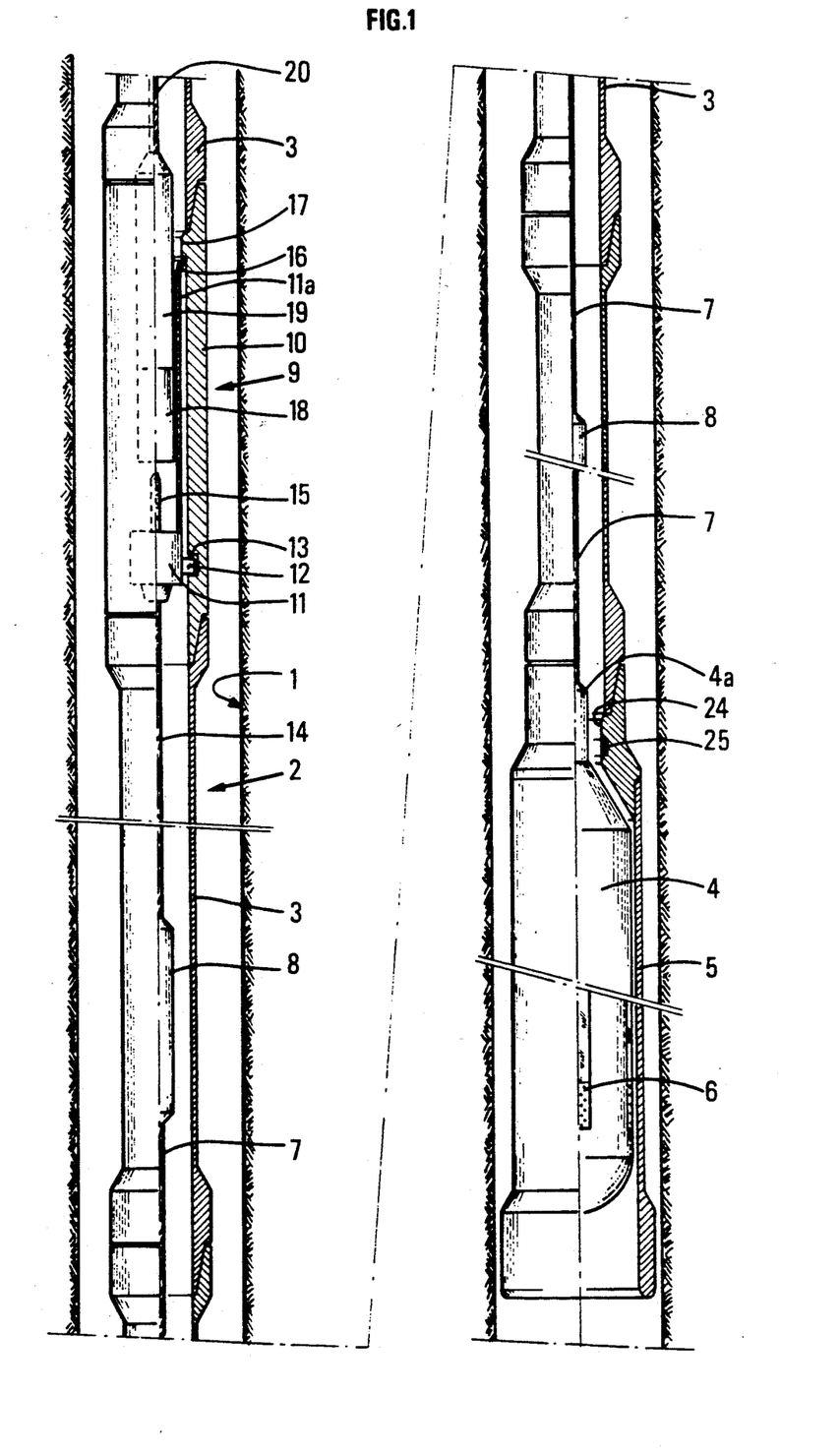
FIG. 1 shows a first variant of the first embodiment procedure of the guiding system where the moving set is within a tubular column used for directing it towards an intervention zone at the bottom of a deflected well.
Figure 4:
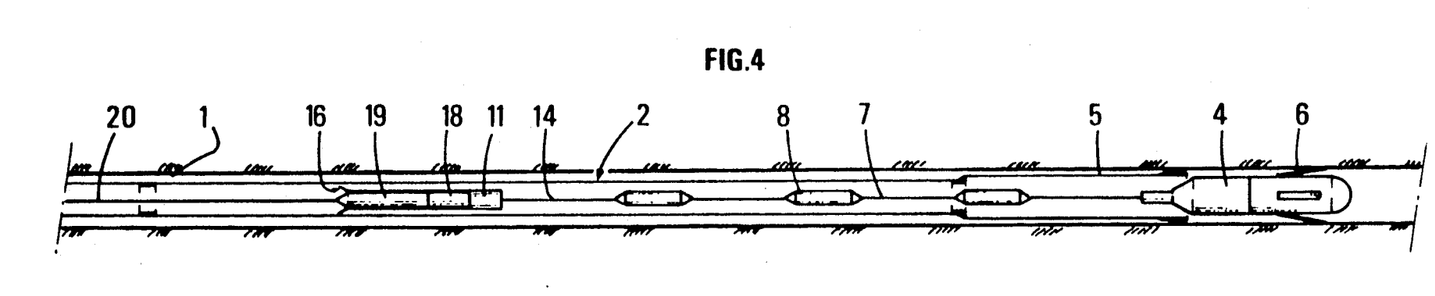
FIG. 4 shows the emission-reception system of FIG. 1 where the moving set is at the beginning of its withdrawal stage, outside the routing tubular column.
Figure 5:
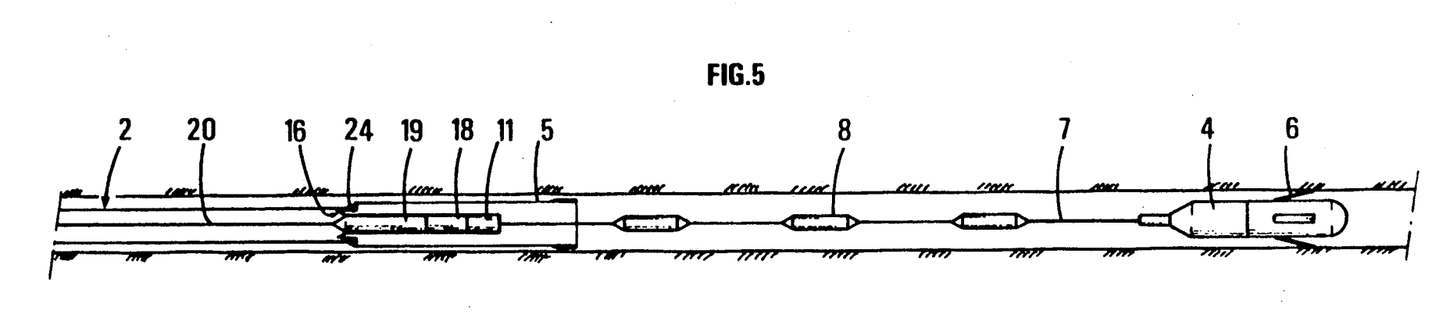
FIG. 5 shows the end stage of the withdrawal of the moving set of FIG. 1.

The guiding system shown in FIG. 1 is suitable for driving into a well a multisonde exploration device. It comprises a guiding tubular column 2 consisting for example of a string of interconnected drill pipes 3. The system comprises a moving set (displaceable set) which can be moved in relation to the tubular column 2 between a recess or backward position shown in FIG. 1 and a withdrawal (or forward) position shown for example in FIG. 5. This displaceable set comprises a first sonde 4 with a section wider than the inner section of the pipes 3 of column 2. In order to protect this first sonde during the running-in operations, a housing 5 that can house the first sonde is fastened at the lower end of the tubular column. The first sonde 4 is fitted with fastening or anchoring arms 6 which can rotate between a folded up position along the body (FIG. 1) and a fastening position against the walls of the well (FIG. 4 or 5). The arms 6 are driven by electrohydraulic control means of the type described for example in French Patent 2,501,380 corresponding to U.S. Pat. No. 4,428,422. The first sonde 4 can for example contain a well source of a known type such as a vibratory source or a pulse source. The first sonde can also contain, depending on the cases, acoustic or seimic wave sensors.

The first sonde 4 is linked by an electric-carrying cable 7 to at least one second sonde 8 with a section narrower than that of pipes 3 of the tubular column 2, which can slide freely within the latter. The displaceable set preferably comprises a string of sondes consisting of a series of narrower sondes 8 arranged at a distance from one another along electric-carrying cable 7, ending in the biggest sonde 4 which is located at the lower end of the tubular column, in the attached housing 5.

Figure 2:
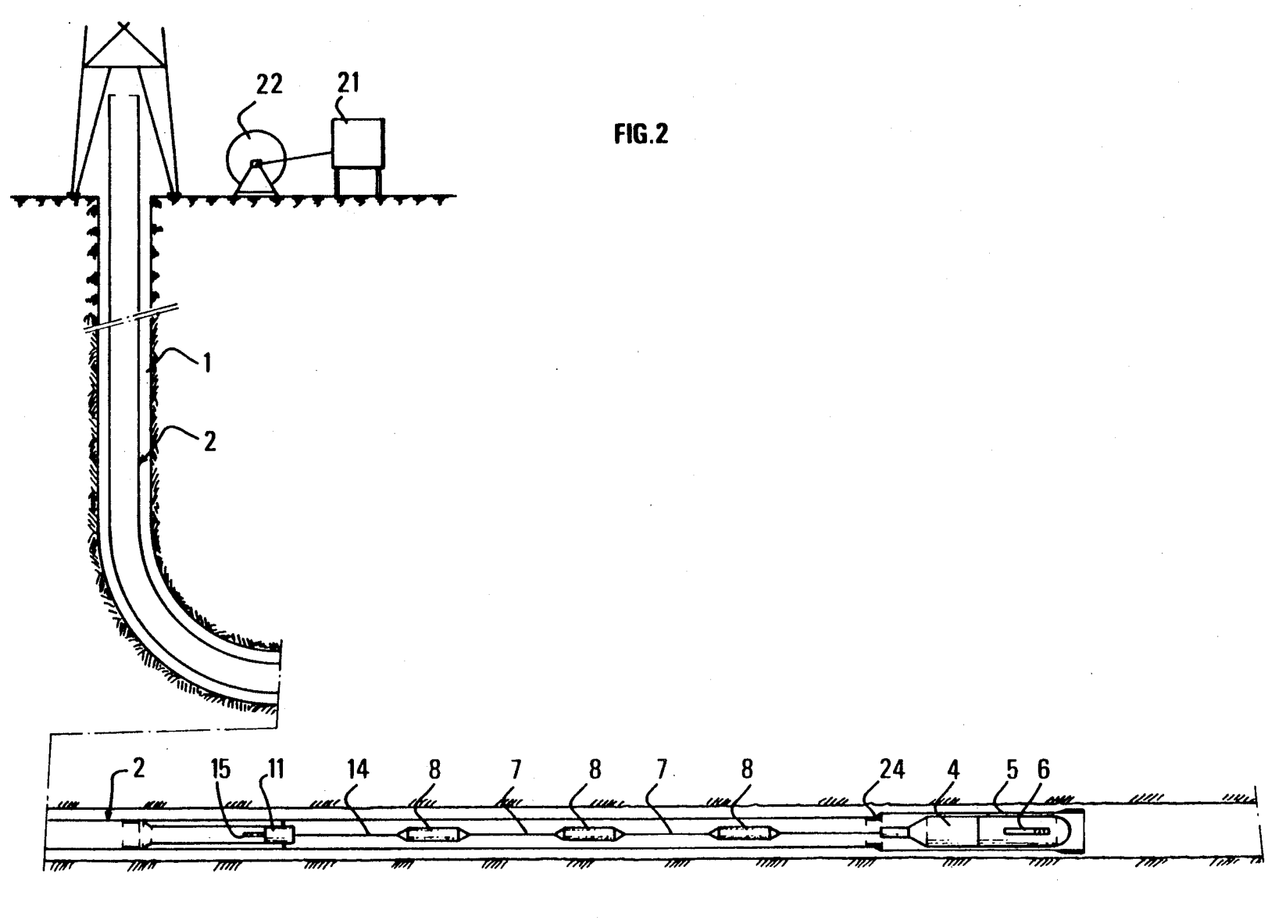
FIG. 2 shows the emission-reception system of FIG. 1 where the moving set is led, in a recess position, towards an operation zone in a well.

The string of sondes (8, 4) is linked to a guide block 9 analogous to those which have already been described in French Patent Applications 2,609,105 or EN. 89/04,554. This block 9 is inserted between two tubing sections 3 of column 2 and comprises a tubular body 10 with an inner section substantially equal to that of pipes 3 and a displaceable guide element 11. Locking means that can be remote controlled lock guide element 11 in a recess position of the string of sondes. They can for example be formed by electric or electrohydraulic-controlled locks 12 which can fit into grooves 13 of the tubular body 10. An element of an electric-carrying cable 14 links the guide element 11 to the first sonde 8 which is narrower. Opposite to the latter, the guide element 11 comprises a multipin contact plug 15 positioned following the axis of body 10 and a tubular extension 11A with a section smaller than that of body 10 and extended by a collar 16. An inner shoulder 17 of the body serves as a thrust for collar 16 and limits the recess of the displaceable set within the tubular column. Collar 16 and the tubular extension 11A are used for guiding a socket plug 18 towards the contact plug 15. Plug 18 is topped by a tubular weighting bar 19 with a substantially equal section. It is electrically connected with a multiconductor cable 20 which links it to a surface control and recording laboratory 21 (FIG. 2). Blocking means analogous to locks 12, which are not shown, allow to block the contact plug 15 in a fitting-in position. Examples of multicontact electric connectors are described in U.S. Pat. No. 4,500,155. Openings (not shown) in collar 16 and across guide element 11 allow to establish a propelling fluid current all along tubular column 2 up to the end housing 5. The inner section of the latter is selected in such a way that a drilling fluid current can push out the sonde 4, whatever the deflection of the well where the set of sondes is taken down may be.

The system comprises means for the delayed connection of plug 18 to plug 15, already described in French Patent 2,547,861 corresponding to U.S. Pat. No. 4,664,189. Cable 20, unwound from a reel 22 (FIG. 3 for example), is introduced within tubular column 2 by a special sub fitted with a lateral window 23 (side-entry sub). By means of a fluid current, plug 18 is propelled until it fits onto contact plug 15.

At the end part of its connection with tubular column 2, housing 5 comprises a shoulder 24 with a section smaller than that of guide element 11, to which a magnetized ring 25 is added (FIG. 1). An electromagnetic sensor connected with multiconductor cables 7, 14, 20, which are not shown, is arranged in the head 4A of sonde 4 and allows an operator to detect the latter's coming out of the sonde 4 from the housing 5 (higher position of the moving set). Another sensor can also be included in guide element 11 for detecting the withdrawal position or lower position of the moving set, as we shall see in the following description of the setting of the system.

The guiding system is set up as follows:

The emission-reception device (4, 8) is taken down into the well, hanging on cable 7. Housing 5 is then introduced and guide element 11 is fastened to cable 7. The guide element resting on the lower shoulder 24, the lower part where the moving set is to take its recess position is completed by adding pipes and guide block 9.

Through successive connections of new tubing sections 3, the displaceable set is brought to the deflected well zone where prospecting operations are to be carried out (FIG. 2).

Figure 3:
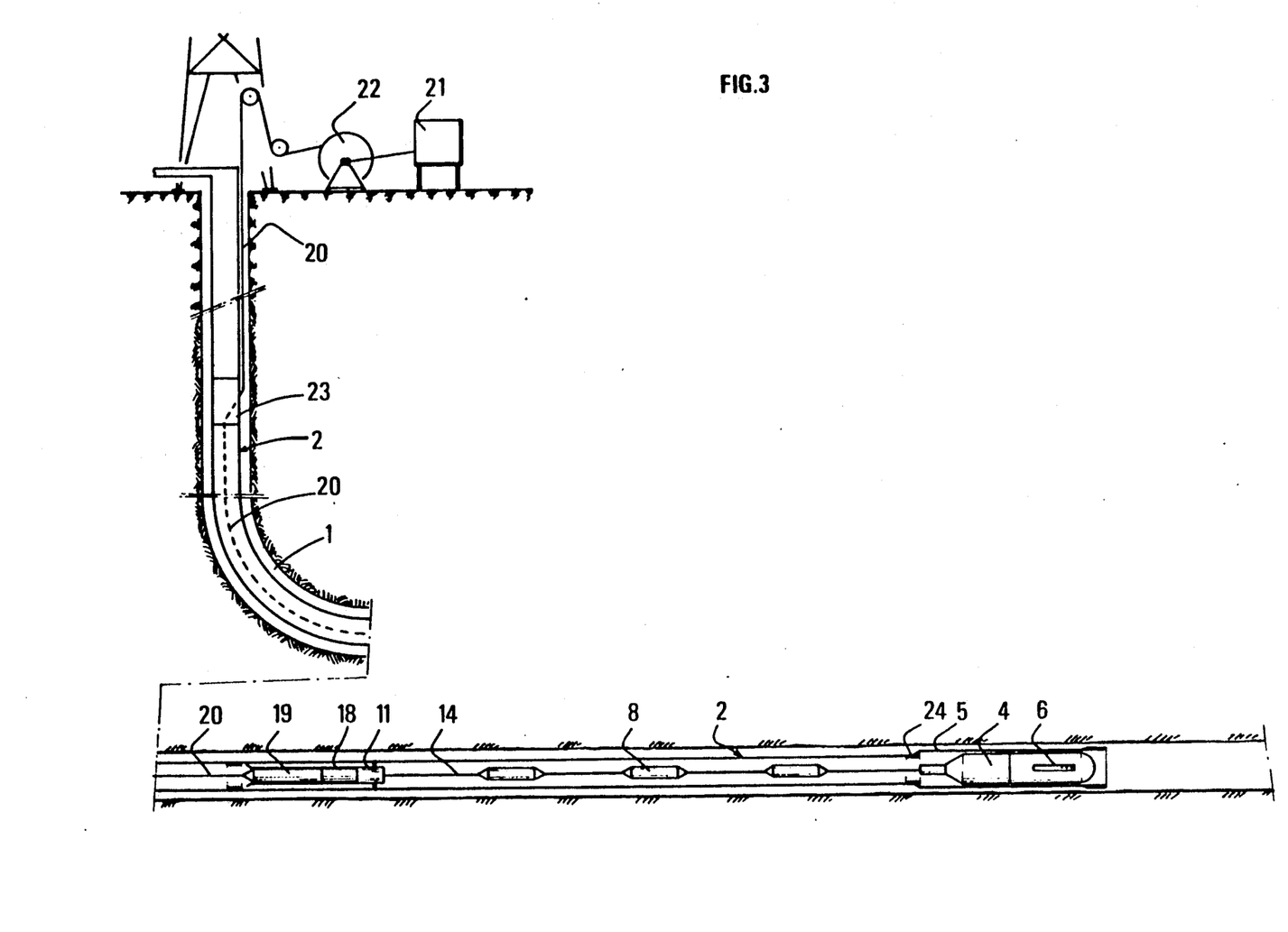
FIG. 3 is a view identical to FIG. 2 which shows the setting of the device for the delayed electric connection of the displaceable set of the emission-reception system with a surface control and recording laboratory.

A special side-entry sub 23 (FIG. 3) is added to the column formed thereby. The multiconductor cable 20 unwound from reel 22 is introduced into column 2 that is then connected with pumping means (not shown) that can set up a fluid current and push weighting bar 19 and plug 18 up to plug 15 of the guide element 11 and lock the latter in its fitting-in position (FIG. 3).

When the electric connection is set up, the cable is pulled on from the surface in order to displace the moving set towards its recess position where guide element 11 enters block 9 and where it can be locked.

Column 2 is then pushed to the starting position where recordings are to be performed.

The tubular column is again connected by pumping in order to push the first sonde 4 out of its protective housing 5 and to release the fastening arms (FIG. 4). The electromagnetic sensor included in head 4A of the sonde 4 detects its coming out.

The opening of arms 6 that are fastened onto the walls of well 1 (FIG. 4) and immobilize sonde 4 is remote controlled from the surface.

The sonde 4 being fastened, a traction is exerted on tubular column 2 from the surface installation in order to make its lower end go backwards and thereby totally withdraw the set of sondes (FIG. 5). The collar of guide element 11 then rests against shoulder 24 at the lower end of tubular column 2. The electromagnetic sensor included in the guide element detects the magnetized ring 25 (FIG. 1).

Signal emission-reception cycles can then be performed.

According to a first service procedure, the first sonde 4, because of its relatively sizeable section, can contain a bigger seismic well source. A vibrator of any type can for example be installed there, notably a vibrator made from piezoelectric or magnetostrictive transducers, or else possibly a pulse source. A well source emitting within the 1-2 KHz frequency range and controlled to emit vibrations of a sliding frequency can for example be selected. The secondary sondes 8 contain adapted sensors. Since the system is adapted for working in well portions that are little inclined on the horizontal, secondary sondes 8 rest on the wall of the well, which ensures a certain mechanical connection with the surrounding formations.

In order to improve the coupling with the walls of the well, it is possible to use secondary sondes 8 also fitted with a anchoring arm and appropriate motor means which can also be remote controlled from the surface. At least one steerable triaxial sensor (accelerometer or geophone or both) combined with an orientation detector, analogous to those described in the previously cited Patent Application EN. 89/04,554, and possibly a hydrophone are for example arranged in each secondary sonde. With such an equipment, it is for example possible to carry out a local study of the grounds within a radius of several meters to several hundred meters around a well, according to the emission frequency, in order to locate the position of reflectors, that of the top or the basis of a reservoir crossed by a well, geologic anomalies, etc.

The set of sondes being in a withdrawal position, it can be displaced from it starting position to the well portion to be studied, and emission, reception and recording cycles can be carried out. The displacing can be continuous or discontinuous. It is achieved by exerting a joined traction on column 2 and on multifunction cable 20. When the displacements are discontinuous, the traction on the column is slightly loosened in order to make it go down and thereby release the portions of cable (7, 14) linking the different sondes together. The direct propagation of acoustic energy along the cables towards the receivers is thus avoided.

Another possible service procedure consists in achieving seismic prospecting operations by means of a seismic source arranged at the surface and of receivers arranged in the different sondes 4, 8.

It is also possible to combine the two procedures by arranging a source in the moving set and another one at the surface, in order to achieve two different recording sets during the same pull-out.

Figure 6:
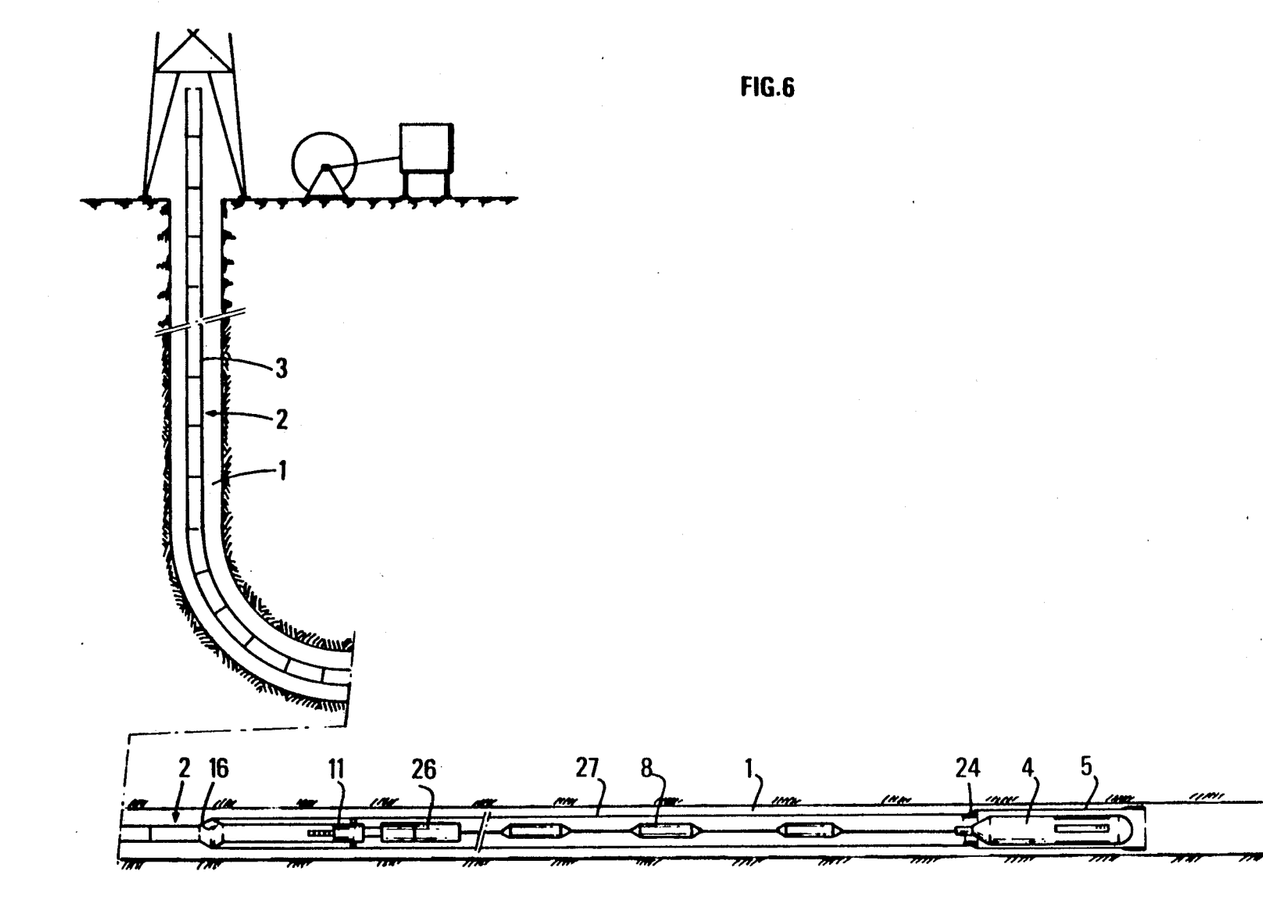
FIG. 6 shows a second variant of the first embodiment procedure of the guiding system where the moving set is totally contained, in a recess position, in a tubular element with a section wider than that of the tubular column and fastened to the end of the latter.
Figure 7:
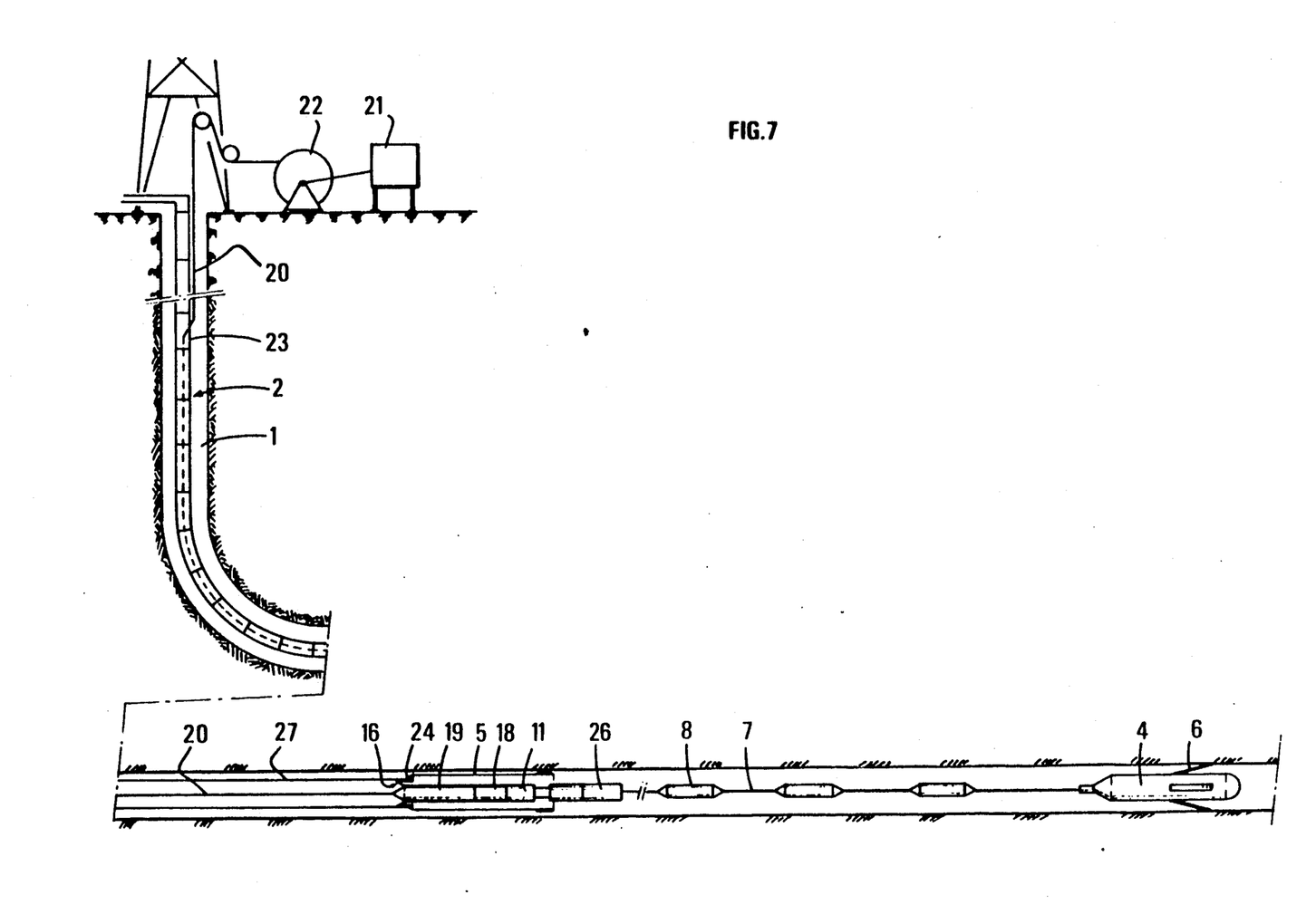
FIG. 7 shows the previous embodiment variant with the moving set in an withdrawal position, outside the attached tubular element.

According to a second variant of the first embodiment procedure (FIG. 6), the displaceable set comprises a set or string of sondes, all or at least two of them having a section larger than that of the pipes of the tubular column 2. One of them is the first sonde 4. The other sonde, 26, is arranged for example at the other end of the string of sondes and contains a source of acoustic or seismic waves. A protective housing 27 with a section and a length sufficient to contain the set of sondes 4, 26 and the sondes 8 inserted in a recess position of the moving set is fastened at the lower end of tubular column 2. The length of this protective housing is about several ten meters for example. In some cases, its section can be intermediate between that of housing 5 and that of the tubular column (FIG. 6) or equal to that of housing 5.

According to a preferred service procedure, the acoustic or seismic source can be housed in the first sonde 4. In this way, by bringing the set of sondes back to its recess position in relation to the tubular column stationary in the well, it is possible to carry out emission-reception cycles until the coming in, which happens last, of sonde 4 containing the source, into the protective housing 27. The source is preferably arranged in the first sonde 4, towards the end of the latter which is furthest from the other sondes, which facilitates its radiation. In the second embodiment variant also, the set of sondes is combined with a guide element 11 fitted with delayed connection means for a multifunction cable 20 fitted with plug 18. As in the previous embodiment procedure, this one also lends itself well to seismic prospecting operations with a surface source, sondes 4 to 26 only containing wave receivers.

According to another embodiment variant (FIG. 8, 9), a string of sondes with substantially identical sections is used, which can all be displaced within a tubular column (a drilling string for example). The first to be introduced into the column is a sonde 28 equipped with at least one retractable fastening arm. A wave emitter of any type likely to be taken down into the column, for example a sparker, is added into sonde 29 at the other end of the set of sondes. All the sondes are connected with the same multifunction cable 30 which links them to a control and recording laboratory 31. Cable 30 enters the column through a side-entry sub 32. After sonde 29, a stopping element 33 is installed on the cable. Column 2 is fitted at its deepest end with a thrust 34 tightened around the cable, against which element 33 is blocked in a withdrawal position of the set of sondes.

As in the previous embodiment variants, the system comprises a magnetized ring included in thrust 34 and electromagnetic sensors (not shown) are included in the head of sonde 27 and of sonde 29, in order to detect the coming out of one and the contacting of the other one against thrust 34 at the end of the withdrawal stroke of the string of sondes.

According to the cases, a piezoelectric, a magnetostrictive source or a sparker that can emit waves in the frequency range between 1 and 2 KHz are used, and the receivers (geophones or accelerometers) are contacted with geologic formations by applying receiving sondes against the wall under the effect of their own weight in the horizontal well portions or possibly by the opening of retractable arms analogous to those of sonde 27 for example.

Figure 8:
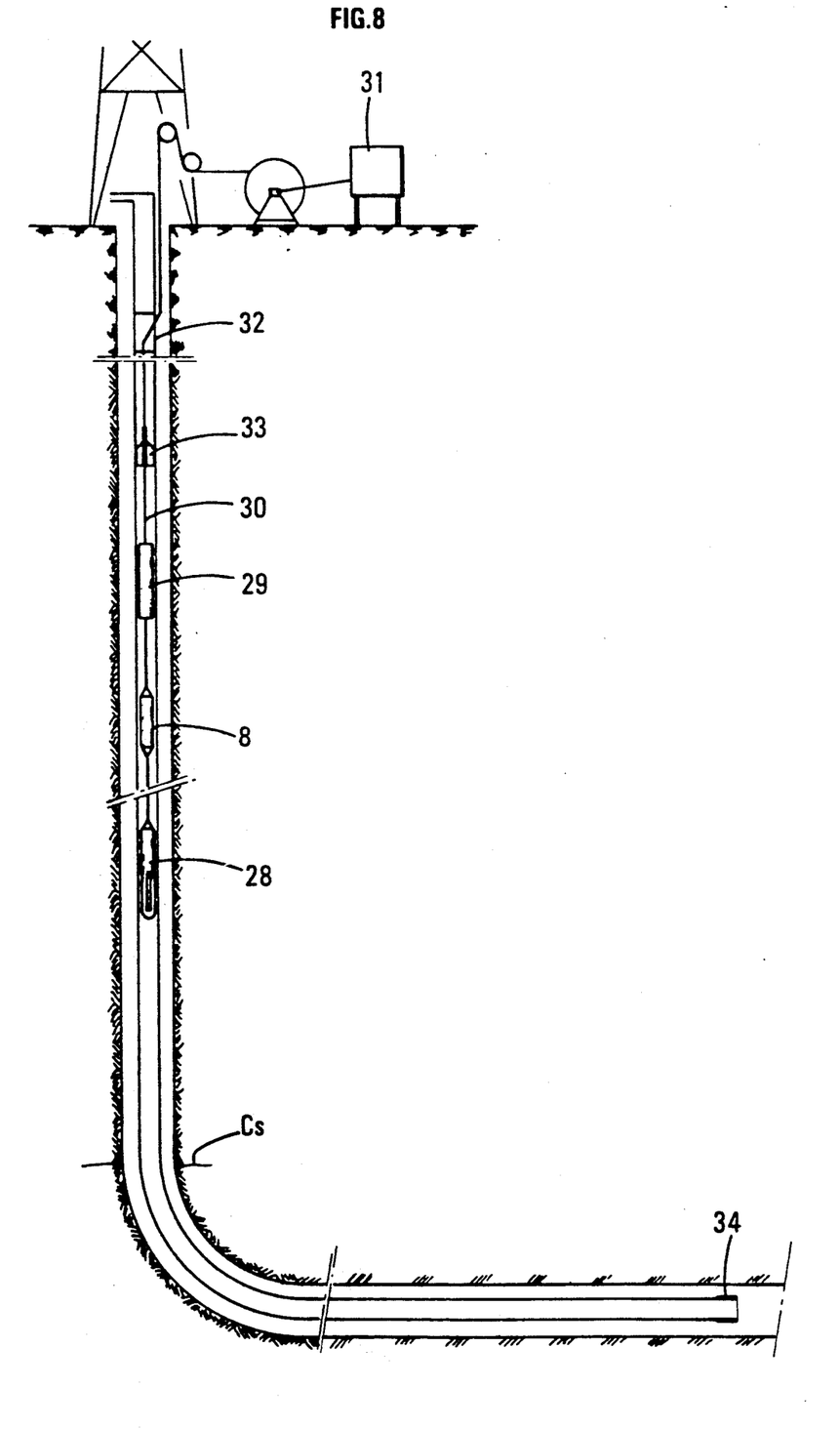
FIG. 8 shows another variant of the first embodiment procedure of the guiding system where the displaceable set is adapted for being pumped up to the end of the tubular column.

This system works as follows:

By adding tubing sections, a column part that is long enough to reach the upper limit Cs of the zone to be prospected is formed and taken down into the well (FIG. 8).

Figure 9:
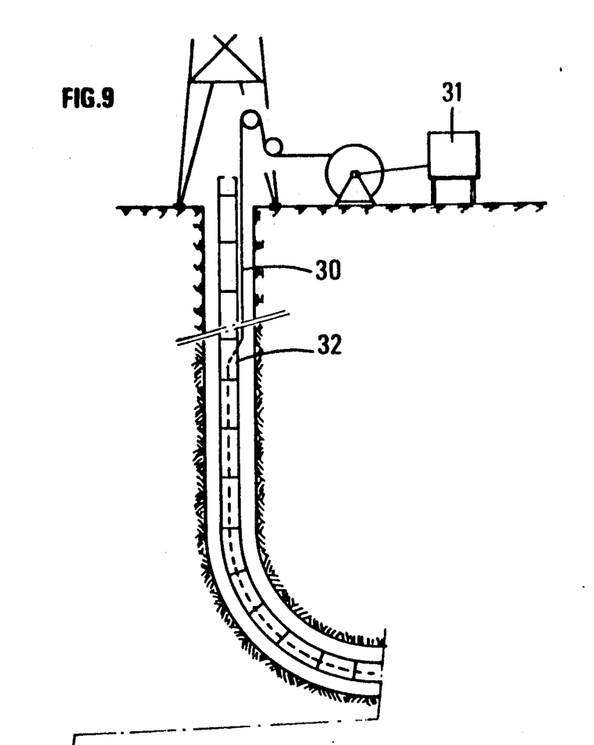
FIG. 9 shows the same embodiment variant in the withdrawal position of the moving set.

The set of sondes is introduced into the column part constituted thereby with its cable 30. It passes outside column 2 through side-entry sub 32. The column is extended until its lower end reaches the lower limit Ci of the recording zone (FIG. 9).

A fluid current is then established in column 2 in order to propel the set of sondes to the bottom and to make the front sonde 28 come outside.

The sonde 28 being fastened in the well through the opening of its fastening arms (FIG. 9), a traction is exerted on the tubing string from the surface installation, so that the string of sondes is pulled out of column 2, and the stopping element 33 is led to rest against thrust 34. The fastening arms are then closed again.

The column and the cable are taken up to the surface at the same speed by exerting a constant mechanical stress. According to the type of receivers that are utilized, loggings can be made continuously on all the successive well portions depending on the height of the surface operating mast, or discontinuously within time intervals corresponding to progression stops. Seismic emission-reception cycles can also be performed during successive pulling stops.

In the previous embodiment variants, the withdrawal position of the moving set is characterized by a lower shoulder at the lower end of the tubular column. It would nevertheless remain within the scope of the invention to suppress this lower thrust, in order to be able, after the delayed connection of the multiconductor cable, to make the moving set come out of the tubular column and to take the latter up after fastening the sonde 4 until the side-entry sub 23 comes close to the surface again. In this case, it is for example possible to achieve continuous loggings over a very great well length, after closing the fastening arms 27, by exerting a traction on the cable without displacing the tubular column 4.

Figure 10:
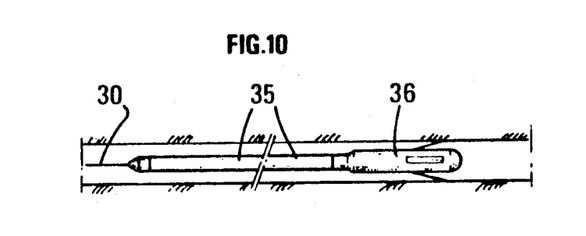
FIG. 10 shows another embodiment procedure of the system where the supple part of the moving set is an extended sheath containing transducers.

According to another embodiment procedure of the system (FIG. 10), the supple part of the moving set consists in a deformable extended sheath 35 comprising sensors. At a first end, this sheath is connected with multiconductor cable 30, either directly, or through a delayed connection device such as device (11, 15) described above. At its opposite end, sheath 35 is linked to a fastening part such as a sonde 36 fitted with a moving arm, analogous to the previous sonde 4.

The system according to the invention has been described in relation to an exploration device with acoustic or seismic signals. It is nevertheless obvious that it might as well be utilized for driving an exploration device of any type, electric, electromagnetic, nuclear, etc, along a well.

We claim:

1. A guiding system for driving in wells, including deflected wells, where progression by effect of gravity is difficult, a non rigid exploration device comprising emitting means and receiving means in at least one first well tool and a second well tool linked with said at least first well tool by a supple connecting means, and anchoring members associated with motor means for releasably stopping said second well tool in the well, the guiding system comprising a tubular column with an inner cross-section larger than the outer cross-section of the at least first well tool including the receiving means, a guiding member provided with releasable anchoring means, with a first electric connecting means suitable for a deferred electric engagement with a second electric connecting means at the end of a multifunction cable means which is connected with a surface installation and with detachable locking means for tightly securing together the first and the second electric connecting means, with blocking means for engagement with said locking means at a position where the exploration device is in a backward position wherein the at least first well tool is contained in the column, and with stop means for said guiding member at a position in the end part where the exploration device is in a forward position wherein the at least first well tool and the second well tool are totally outside the column; said guiding system also including displacement means at the surface installation for displacing said exploration device from the backward position to the forward position by pulling back said column when said first well tool is stopped in the well.

2. A guiding system according to claim 1, wherein the at least one first well tool includes a flexible sheath with sensing means therein, said flexible sheath being connected with the second well tool.

3. A guiding system according to claim 1 or 2, wherein the tubular column is provided at the end thereof with a seat for the second well tool, the cross-section of said second tool being larger than the inner cross-section of the tubular column, said second well tool being applied against said seat in the backward position of the exploration device.

4. A guiding system according to claim 3, further comprising a protective housing secured to the end of the tubular column for containing said second well tool in the backward position of the exploration device.

5. A guiding system according to claim 1 or 2, wherein the cross-section of said second well tool is smaller than the inner cross-section of the tubular column, the exploration device being totally within the tubular column in the backward position of the exploration device.

6. A guiding system according to claim 5, comprising several first well tools including therein wave reception elements.

7. A guiding system according to claim 5, comprising a set of interconnected first well tools, the emitting means being arranged at the top end of said set.

8. A guiding system as claimed in claim 1 or 2, wherein said emitting means are arranged in the second well tool.

9. A system as claimed in claim 1 or 2, wherein the tubular column comprises a string of tubing sections and a tubular element of larger cross-section that of said string fastened to the end thereof.

10. A system as claimed in claim 1 or 2, wherein said emitting means are disposed at the surface installation.

11. A guiding system as claimed in claim 1 or 2 wherein the exploration device comprises acoustic emitting means and acoustic receiving means.

12. A guiding system as claimed in claim 1, wherein the exploration device comprises means for emitting electric signals and means for receiving electric signals.

13. A guiding system as claimed in claim 1, wherein the exploration device comprises emission-reception means for electromagnetic signals.

14. A guiding system as claimed in claim 1, wherein the emission means are arranged at the surface installation and in said well tools.

15. A method for guiding in wells, including deflected wells, where progression by effect of gravity is difficult, a non-rigid exploration device comprising emitting means and receiving means in at least one first well tool and a second well tool linked with said at least first well tool by a supple connecting means, and anchoring members associated with motor means for releasably stopping said second well tool in the well, comprising:
- securing the exploration device to a guiding member provided with releasable anchoring means and with a first electric connecting means;
- introducing into the well the exploration device with the secured guiding member and a portion of a tubular column, having an inner cross-section larger than an outer cross-section of the at least first well tool;
- displacing the exploration device along the well by extending the tubular column through successive connection of column sections, until said portion of the column reaches a determined portion of the well, and providing an electric connection between the exploration device and a surface installation;
- anchoring the well tool provided with anchoring members to a wall of the well; and
- pulling the tubular column backwards by a traction force exerted thereon from the surface, over a length at least equal to that of the exploration device so as to bring the devices totally outside the tubular column in an operating state.

* * * * *